(12) United States Patent
Belleville

(10) Patent No.: US 7,819,358 B2
(45) Date of Patent: Oct. 26, 2010

(54) AIRCRAFT WITH REDUCED ENVIRONMENTAL IMPACT

(75) Inventor: Mathieu Belleville, Bazus (FR)

(73) Assignee: Airbus France, Toulouse (FR)

( * ) Notice: Subject to any disclaimer, the term of this patent is extended or adjusted under 35 U.S.C. 154(b) by 170 days.

(21) Appl. No.: 11/691,200

(22) Filed: Mar. 26, 2007

(65) Prior Publication Data

US 2008/0105781 A1 May 8, 2008

(30) Foreign Application Priority Data

Mar. 28, 2006 (FR) .................................. 06 02671

(51) Int. Cl.
B64C 15/00 (2006.01)

(52) U.S. Cl. ......................................... 244/52; 244/55

(58) Field of Classification Search .................. 244/52, 244/53 R, 54, 55, 53 B, 62, 56; 60/228, 232
See application file for complete search history.

(56) References Cited

U.S. PATENT DOCUMENTS

| | | | | | |
|---|---|---|---|---|---|
| 2,510,561 | A | * | 6/1950 | De Laval | 244/87 |
| 2,953,322 | A | * | 9/1960 | Lewis | 244/46 |
| 2,969,936 | A | * | 1/1961 | Dorman et al. | 244/15 |
| 3,045,953 | A | * | 7/1962 | Eggers et al. | 244/52 |
| 3,415,468 | A | * | 12/1968 | Labombarde | 244/13 |
| 3,666,211 | A | * | 5/1972 | Cathers et al. | 244/54 |
| 3,706,293 | A | * | 12/1972 | Hancks et al. | 114/20.1 |
| 3,912,202 | A | * | 10/1975 | Jenkins | 244/52 |
| 4,809,932 | A | * | 3/1989 | Muller | 244/52 |
| 4,966,338 | A | * | 10/1990 | Gordon | 244/54 |
| 5,020,740 | A | * | 6/1991 | Thomas | 244/93 |
| 5,086,993 | A | * | 2/1992 | Wainfan | 244/48 |
| 5,135,185 | A | * | 8/1992 | Adamson et al. | 244/55 |
| 5,957,405 | A | * | 9/1999 | Williams | 244/15 |
| 6,543,718 | B2 | * | 4/2003 | Provost | 244/12.4 |
| 6,592,073 | B1 | * | 7/2003 | Meekins | 244/105 |
| 7,007,890 | B2 | * | 3/2006 | Beutin et al. | 244/54 |
| 7,107,755 | B2 | * | 9/2006 | El Hamel et al. | 60/224 |
| 7,262,394 | B2 | * | 8/2007 | August | 244/3.3 |
| 2005/0178887 | A1 | * | 8/2005 | Beutin et al. | 244/54 |
| 2005/0224631 | A1 | * | 10/2005 | August | 244/3.3 |
| 2007/0284477 | A1 | * | 12/2007 | Guering | 244/54 |

FOREIGN PATENT DOCUMENTS

| | | | |
|---|---|---|---|
| DE | 947671 | | 8/1956 |
| DE | 1133984 | | 7/1962 |
| GB | 0862476 | A * | 3/1961 |
| GB | 1397068 | | 6/1975 |

OTHER PUBLICATIONS

Preliminary Search Report dated Dec. 12, 2006 with English translation.
S. Steinke, "Aud Der Trickkiste Der Flugzeugentwickler Airbus-Konzepte Fuer Uebermorgen," Flug Revue, Stuttgart, De, vol. 1/2001, XP009053625, pp. 22-25, Jan. 2001.

* cited by examiner

*Primary Examiner*—Michael R Mansen
*Assistant Examiner*—Brian M O'Hara
(74) *Attorney, Agent, or Firm*—Dickinson Wright PLLC

(57) ABSTRACT

According to the invention, said aircraft comprises at least one engine which has ducted propellers and is mounted on the back of the rear portion of the fuselage, the cowling being able to be oriented about the axis of said engine.

7 Claims, 7 Drawing Sheets

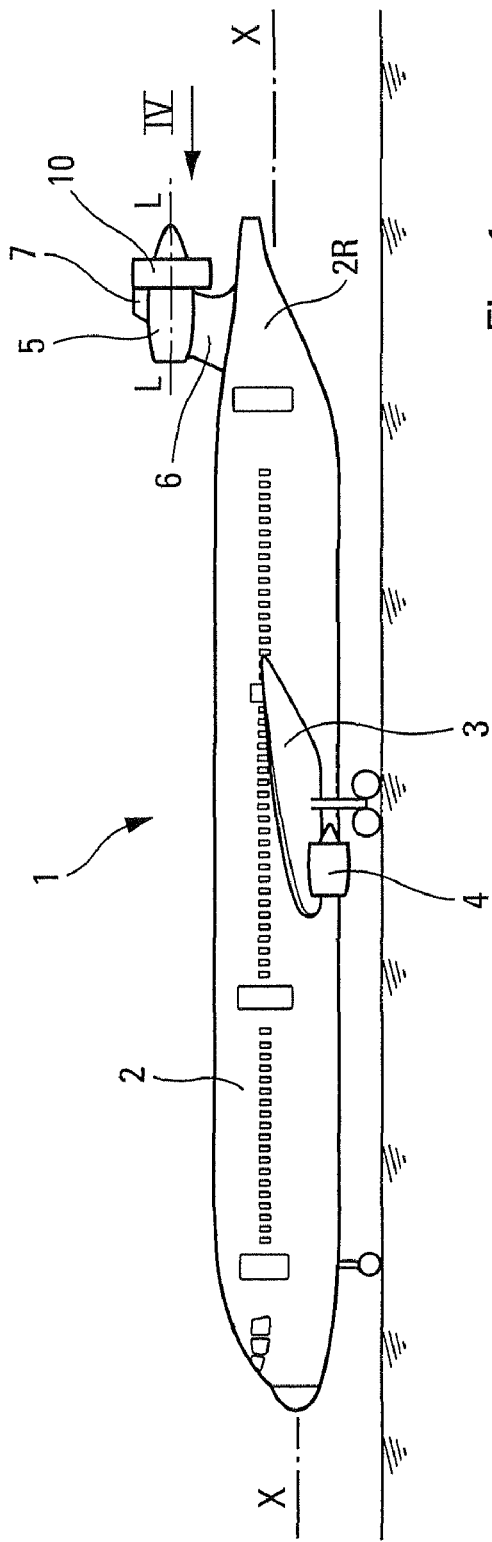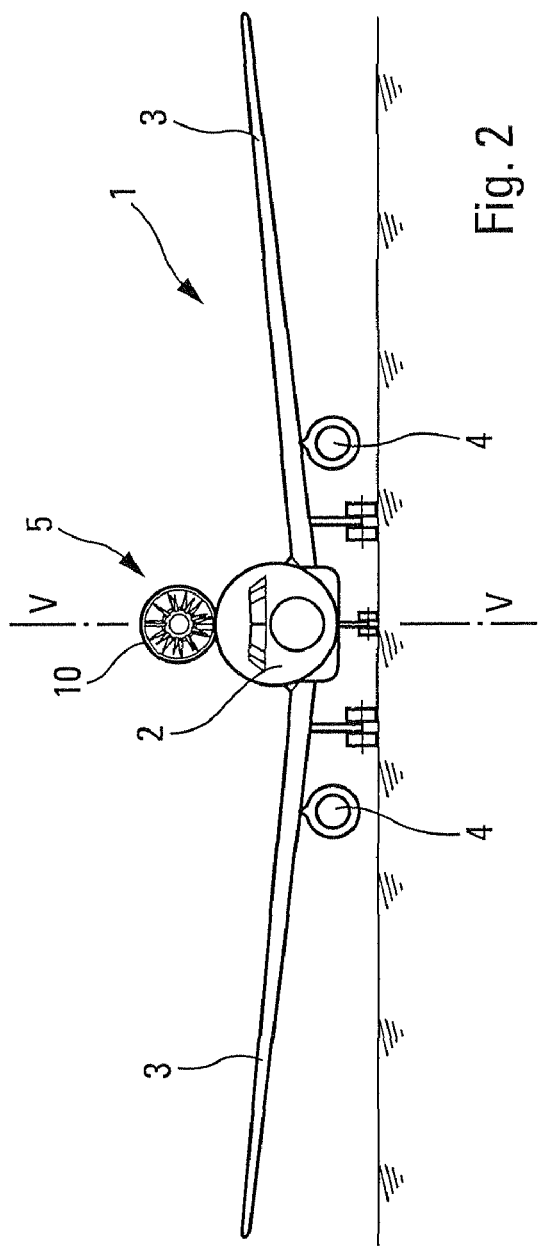

AIRCRAFT WITH REDUCED ENVIRONMENTAL IMPACT

The present invention relates to an aircraft with reduced environmental impact.

It is known that propulsive propeller systems, for example turboprops with a single propeller or propfans with contrarotating propellers, have better energy efficiencies than turbine engines.

However, the majority of existing aircraft are propelled by turbine engines which, consequently, are not only heavy fuel users but also sources of environmental pollution by virtue of what they discharge into the atmosphere.

Therefore, with regard to energy savings and environmental pollution, it would be more advantageous to provide aircraft with propulsive propeller systems rather than with turbine engines.

However, during operation, propulsive propeller systems are even more noisy than turbine engines, which means that the advantage which will be gained in terms of energy savings and discharged environmental pollution by replacing turbine engines with propulsive propeller systems would be accompanied by the disadvantage of an increase in noise pollution. The resultant noise pollution would be unacceptable and, in any event, difficult to reconcile with the regulations currently in force.

Moreover, GB-1 397 068 has already disclosed aircraft comprising:

- at least one turbine engine mounted at the rear and on the back of the aircraft; and
- a cell whose rear portion comprises a horizontal stabilizer and two vertical stabilizers, which are respectively arranged at the ends of said horizontal stabilizer, said rear portion forming a shielding surface for the noise generated in the downward direction by said turbine engine.

Of course, in such an arrangement the axis of said turbine engine is parallel to the longitudinal axis of the aircraft, which means that the noise generated by said engine, which, as is known, is emitted in the forward and rearward directions thereof, is propagated in the forward and rearward directions of said aircraft, with only some of this noise being shielded in the downward direction by said shielding surface of the rear portion of the cell, provided that said horizontal stabilizer is situated to the rear of the outlet of the nacelle of said turbine engine. The overall effectiveness of the anti-noise shield formed by the rear portion of the cell is therefore not optimal and, in order to achieve substantial shielding of downwardly directed noise, the area of said shielding surface would have to be increased. However, that would negatively impact the wetted area balance of the aircraft, thus increasing its drag and thereby entailing a necessary increase in thrust and thus in fuel consumption of the aircraft, a situation which runs counter to the objective sought.

The present invention aims to overcome these disadvantages and relates to an aircraft whose fuel consumption is close to that of a comparable propeller aircraft, whose ground-directed noise emission is at most equal to that of a, likewise comparable, aircraft with a turbine engine, and whose drag in flight is reduced.

To this end, according to the invention, the aircraft with reduced environmental impact, having a longitudinal axis and a vertical mid-plane containing said longitudinal axis, said aircraft comprising, at its rear, neither a horizontal stabilizer nor a vertical stabilizer, but comprising:

- at least one engine provided with at least one pusher propeller mounted at the rear and on the back of said aircraft, with its axis at least substantially parallel to said longitudinal axis of the aircraft; and
- a cowling which is arranged around said propeller such that the efflux therefrom can be oriented with respect to said axis of said propeller so as to be able to control the direction and pitch of said aircraft, is noteworthy in that said engine is supported on the back of said aircraft by way of a pylon which separates said engine from said back, and in that said cowling is jointed in one piece to said pylon.

Thus, by virtue of the present invention, since the noise from a propeller is highly directional, with most of the noise being perceived in the vicinity of the propeller plane and said noise decreasing considerably on moving away from this plane, excellent shielding of the noise from the propeller or propellers is achieved by said cowling. Furthermore, since said cowling is jointed in one piece to allow the direction and pitch of the aircraft to be controlled, it is possible to dispense with the rear stabilizers and thus reduce drag.

The invention therefore makes it possible to benefit from the good performance levels of propeller engines while at the same time avoiding their disadvantages and even improving the overall performance levels of the aircraft.

To optimize the direction and pitch control of the aircraft using the propeller efflux, it is advantageous for said propeller or propellers to be arranged at the rear of said engine and to be able to exert a thrust on said aircraft. The propeller or propellers is or are thus situated at a point of reduced cross section on the aircraft fuselage, thus providing more space for its or their installation. Furthermore, the propeller or propellers is or are thus remote from the passenger cabin, a situation which is beneficial for passenger comfort.

Furthermore, it is advantageous for said engine to comprise two contrarotating coaxial propellers. Specifically, in this case, the diameter of said propellers, and hence that of the cowling which surrounds them, is reduced, thus facilitating the integration of said engine on the aircraft.

Preferably, said pylon supporting the engine comprises an extension above said engine and the lower portion of said cowling is jointed to said pylon, whereas the upper portion of said cowling is jointed with respect to said extension.

Said lower portion of the cowling may be ball-jointed to said pylon and actuating means may be provided, both at the lower portion and at the upper portion of said cowling, to turn said cowling around said ball.

Of course, the aircraft according to the present invention may be a single-engine aircraft and comprise only one engine which has a propeller or propellers and is mounted at the rear and on the back of said aircraft.

However, apart from this single engine, the aircraft may additionally comprise at least two turbine engines carried symmetrically by the wings of said aircraft. Such an arrangement is advantageous in the sense that the rear engine with a propeller or propellers, which is a low fuel user and emits little noise on account of said cowling, makes it possible for the power (and thus the noise and fuel consumption) of the wing-mounted turbine engines to be reduced.

In a preferred variant embodiment of the aircraft according to the present invention, there are provided two engines which have a ducted propeller or ducted propellers and are arranged one beside the other, with their axes parallel, on the back of the aircraft.

In this latter case, it is advantageous for the two pylons respectively carrying said engines which have a ducted propeller or ducted propellers to form a V which is open to the top and which is symmetrical with respect to said vertical mid-plane of the aircraft, since in that case it is possible to use particularly simple joints for the two cowlings. This is because the cowling of each of said engines can be jointed about an axis whose direction is coincident with the general direction of the corresponding pylon, the two joint axes thus forming a V which is symmetrical with respect to said vertical mid-plane and which is open to the top, actuating means being provided to turn each of said cowlings about the corresponding joint axis. Each of said two joint axes can then be defined by a lower joint between the lower portion of said cowling and the pylon and by an upper joint between the upper portion of said cowling and said extension of the pylon.

The figures of the appended drawing will give a clear understanding of how the invention can be implemented. In these figures, identical references denote like elements.

FIGS. 1 and 2 schematically illustrate a first exemplary embodiment of the aircraft according to the present invention, in a side view and a front view, respectively.

Figure 8:
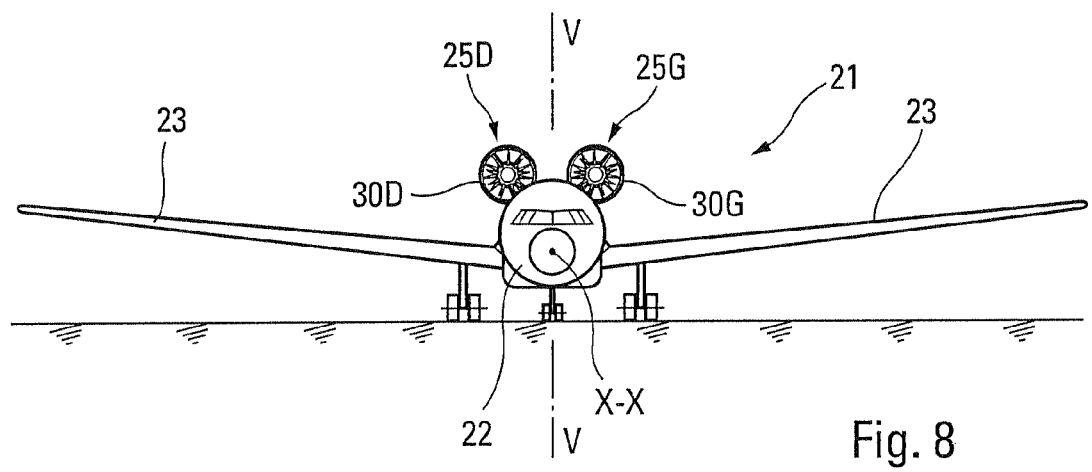
Figure 9:
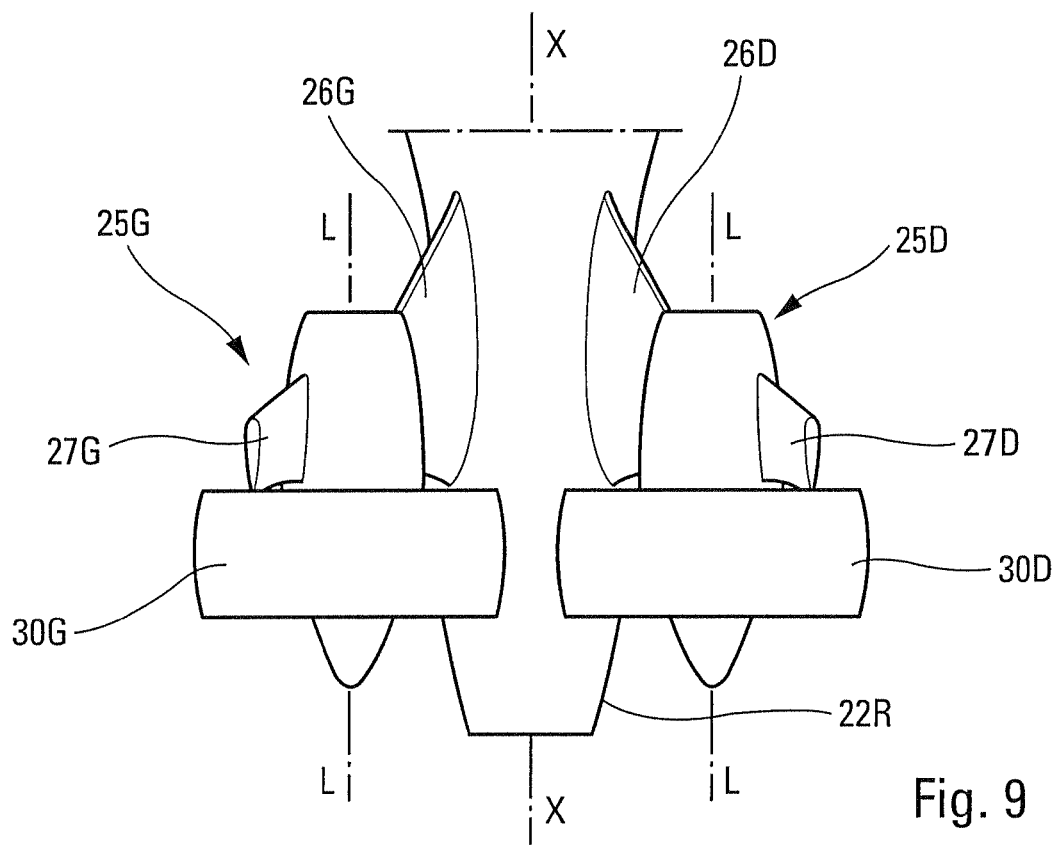

FIGS. 8 and 9 schematically illustrate a preferred exemplary embodiment of the aircraft according to the present invention, in a front view and an enlarged partial plan view, respectively.

Figure 10:
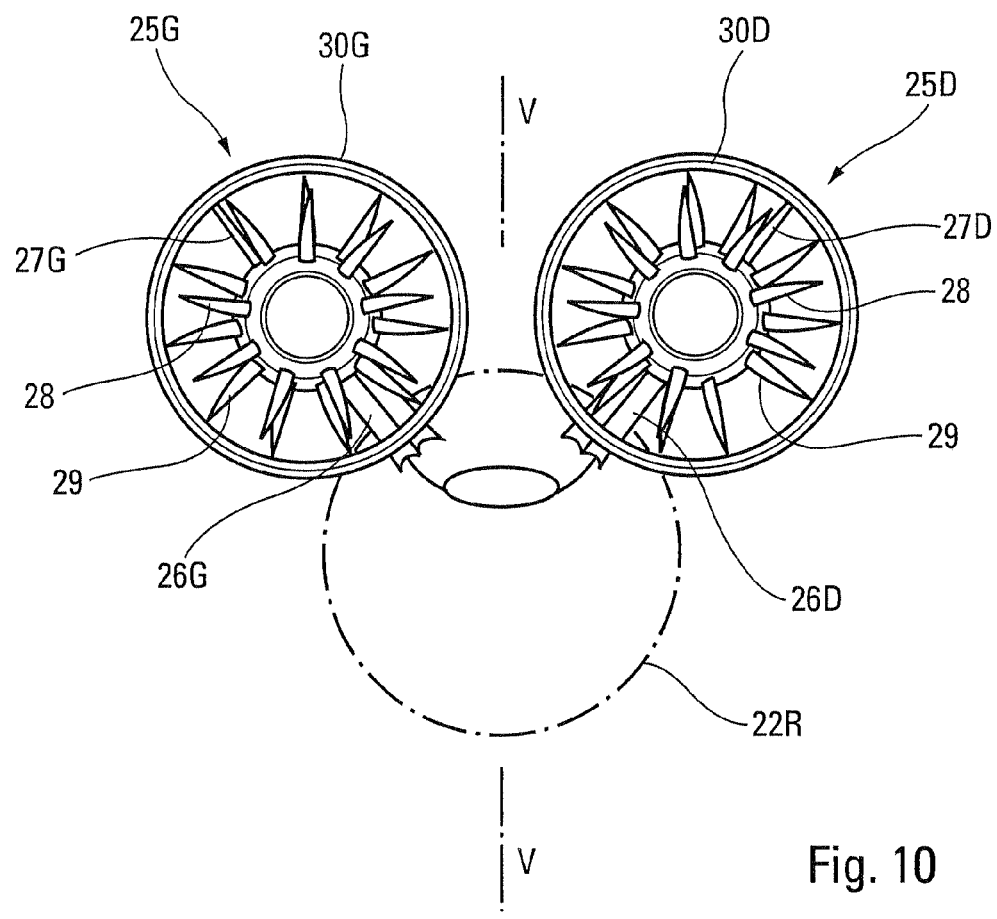

FIG. 10 is a rear view of the aircraft shown in FIGS. 8 and 9.

Figure 11:
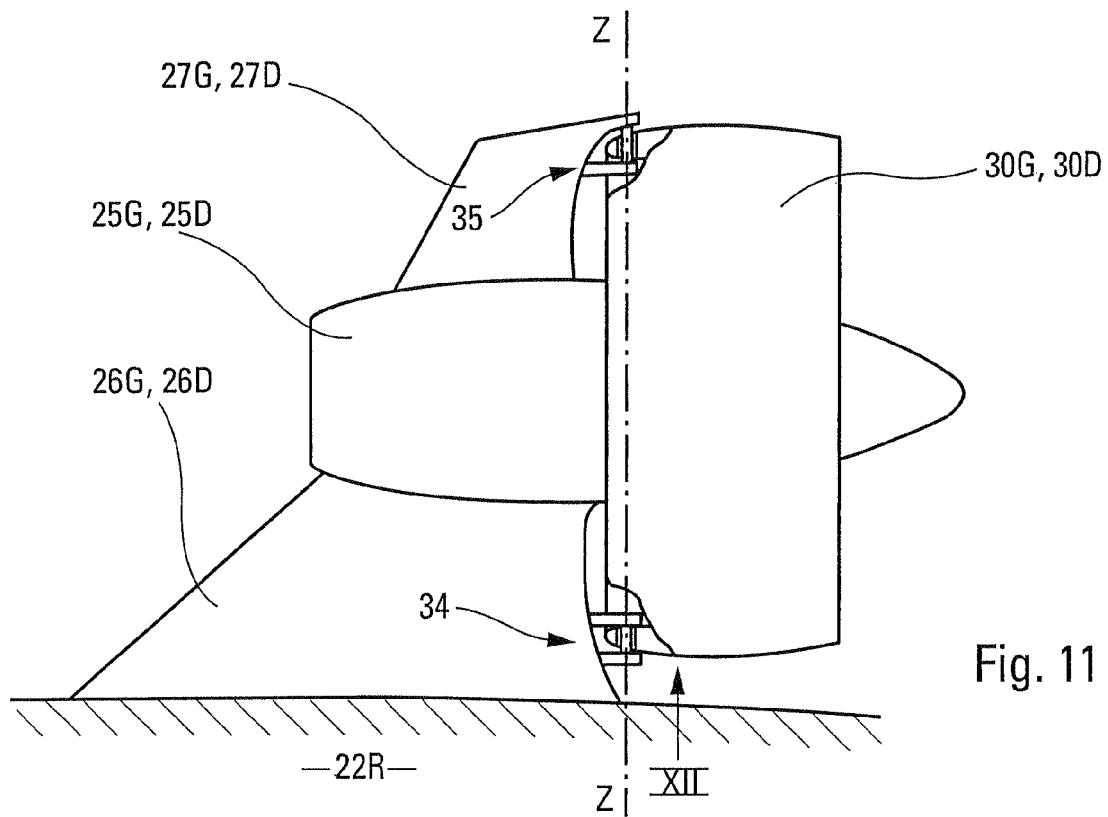

FIG. 11 schematically illustrates, in a side view, the jointing of each of the engine cowlings of the aircraft shown in FIGS. 8 to 10.

Figure 12:
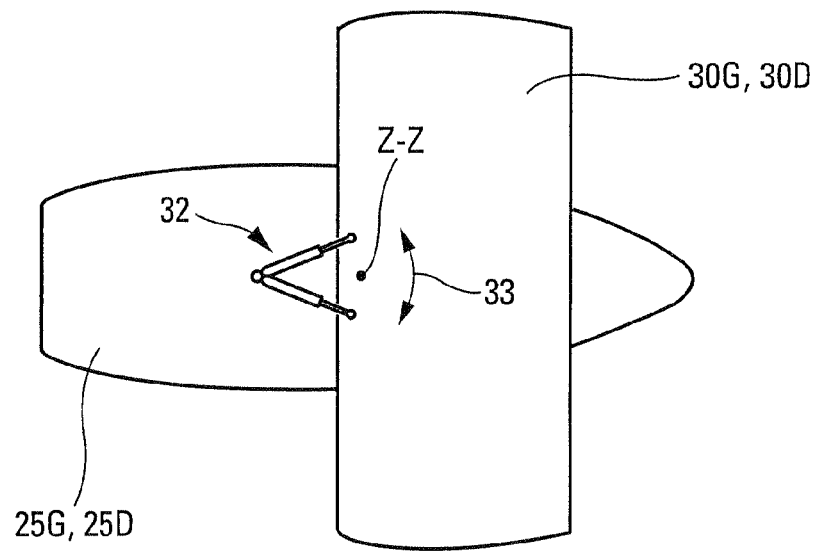

FIG. 12 is a view as seen in the direction of the arrow XII shown in FIG. 11.

Figure 13:
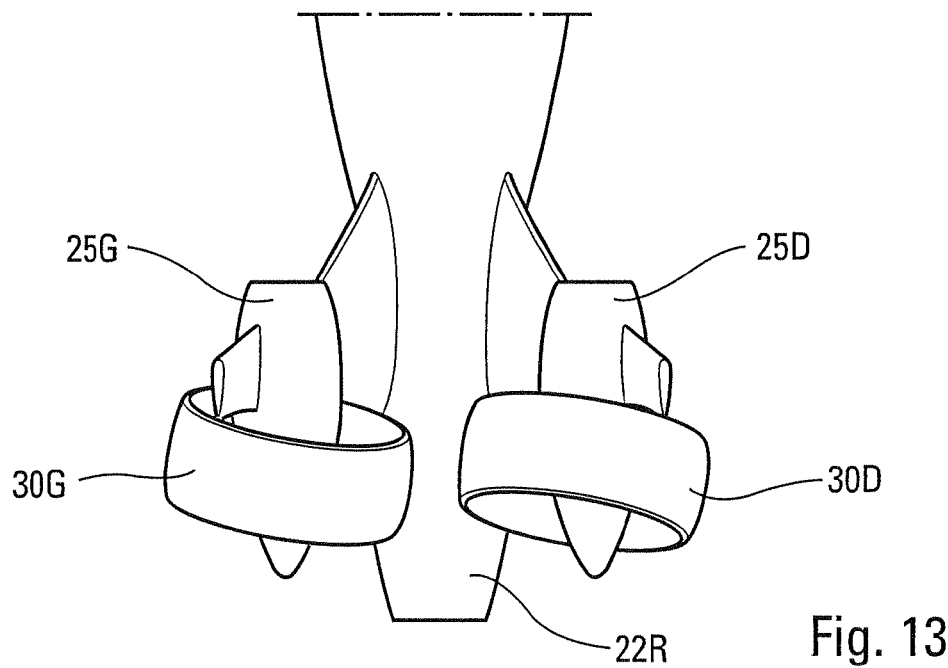
Figure 14:
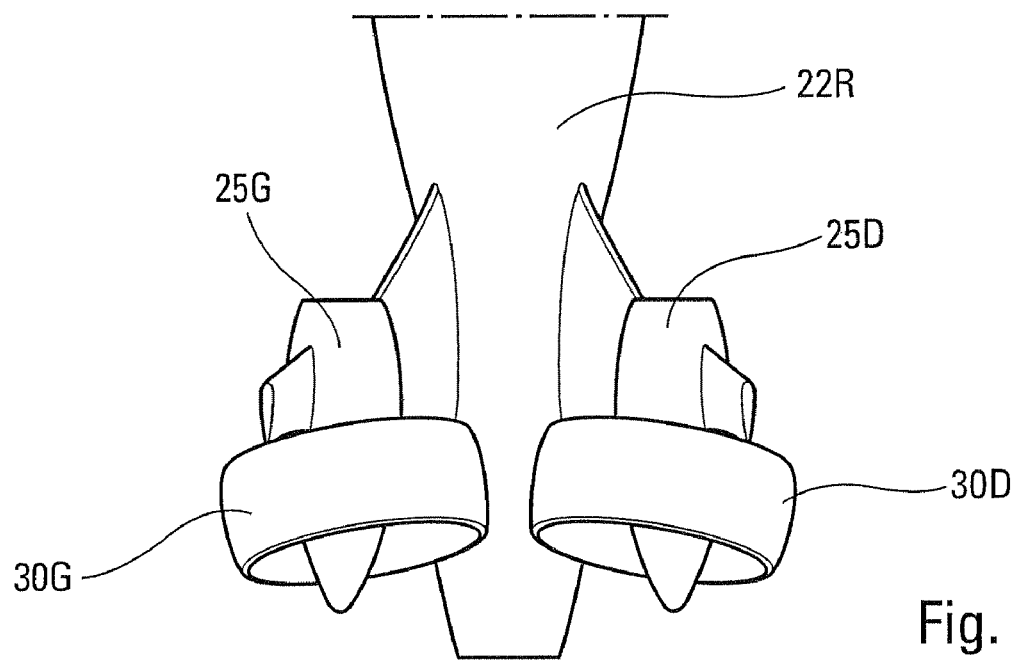
Figure 15:
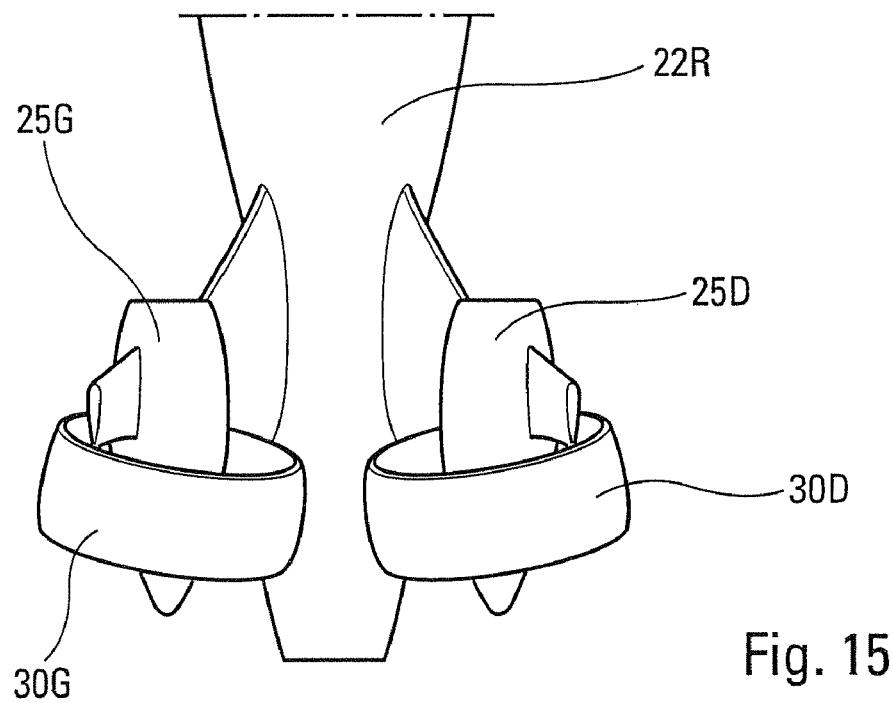

FIGS. 13 to 15 illustrate various deflected positions of the propeller cowlings of the aircraft shown in FIGS. 8 to 10.

The example of a commercial aircraft 1, according to the invention and represented schematically in FIGS. 1 to 4, has a longitudinal axis X-X and a vertical mid-plane V-V. It comprises a fuselage 2 and two wings 3 which are symmetrical with respect to the vertical mid-plane V-V. The wings 3 each carry a turbine engine.

At the rear, the aircraft 1 comprises neither a horizontal stabilizer nor a vertical stabilizer.

Mounted on the back of the rear portion 2R of the fuselage 2 is a propeller engine 5 whose axis L-L is parallel to the longitudinal axis X-X of the aircraft 1 and is arranged, exactly like the latter, in said vertical mid-plane V-V. The engine 5 is carried by a pylon 6 connected to the structure of the aircraft 1. The pylon 6 is extended above the engine 5 by an extension 7. At its rear, the engine 5 comprises two contrarotating pusher propellers 8, 9 surrounded by a cowling 10.

By virtue of this cowling 10, the noise generated by the propellers 8, 9 is shielded all around the axis L-L.

Consequently, during takeoff and landing, the noise emitted by the engine 10 of the aircraft 1 toward the ground is greatly reduced.

It will be noted that, by comparison with a conventional twin-turbine engine aircraft of equal performance, the aircraft 1 can use less powerful (and thus less noisy) turbine engines 4 owing to the presence of the engine 5 at the rear. Overall, the aircraft 1 can thus be less noisy and consume less fuel than such a twin-turbine engine aircraft.

Figure 3:
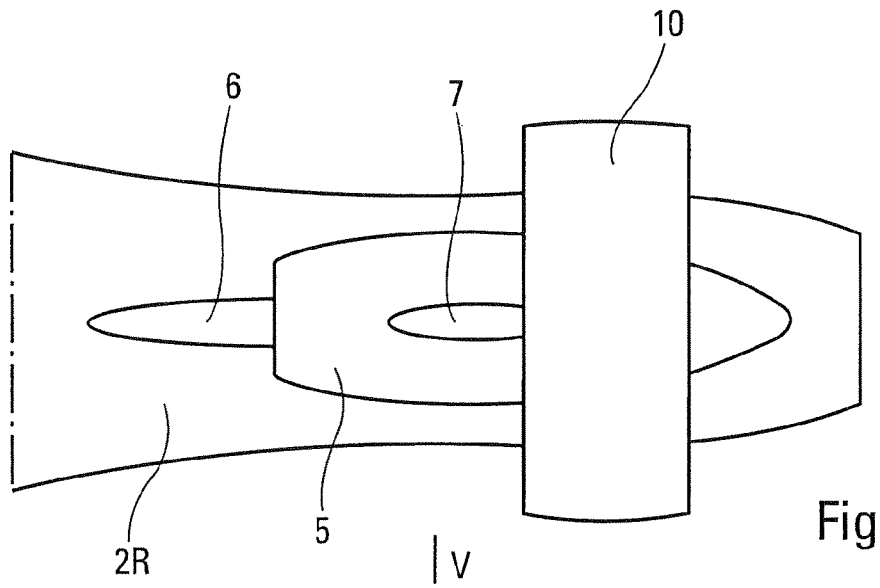
FIG. 3 is a schematic plan view, on an enlarged scale, of the rear portion of the aircraft shown in FIGS. 1 and 2.
Figure 4:
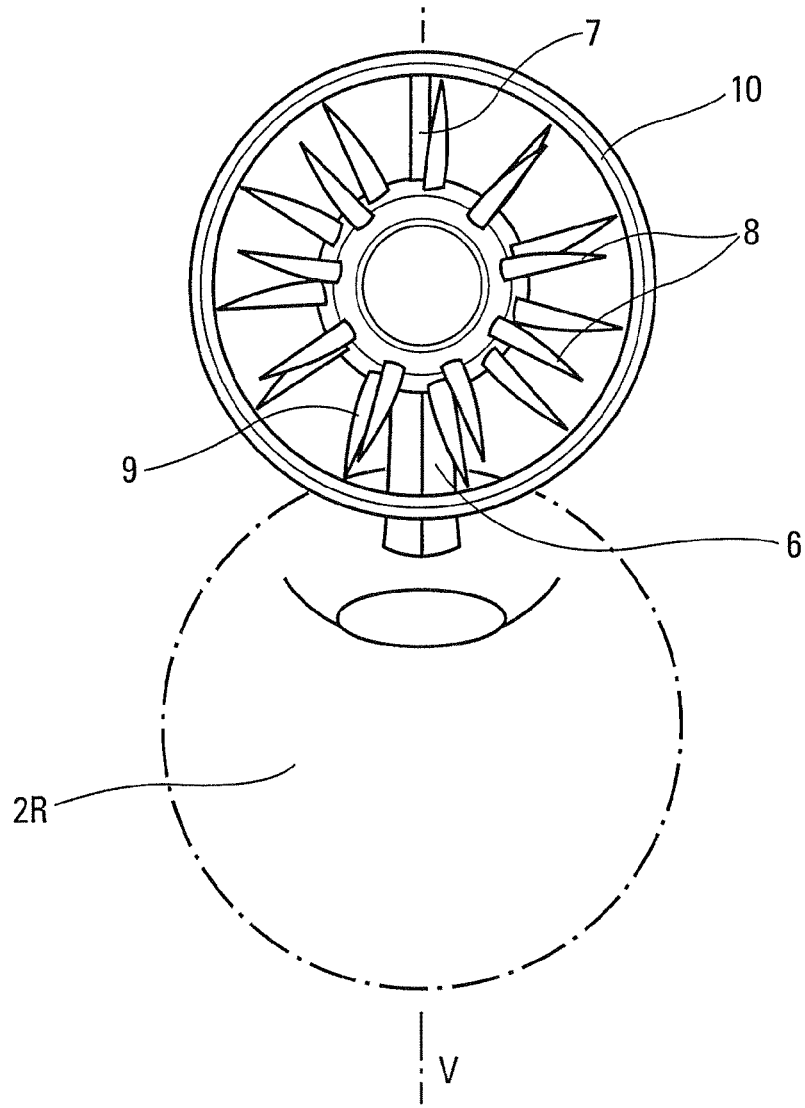
FIG. 4 is a schematic rear view of the rear portion of the aircraft shown in FIGS. 1 to 3, as seen in the direction of the arrow IV shown in FIG. 1.
Figure 5:
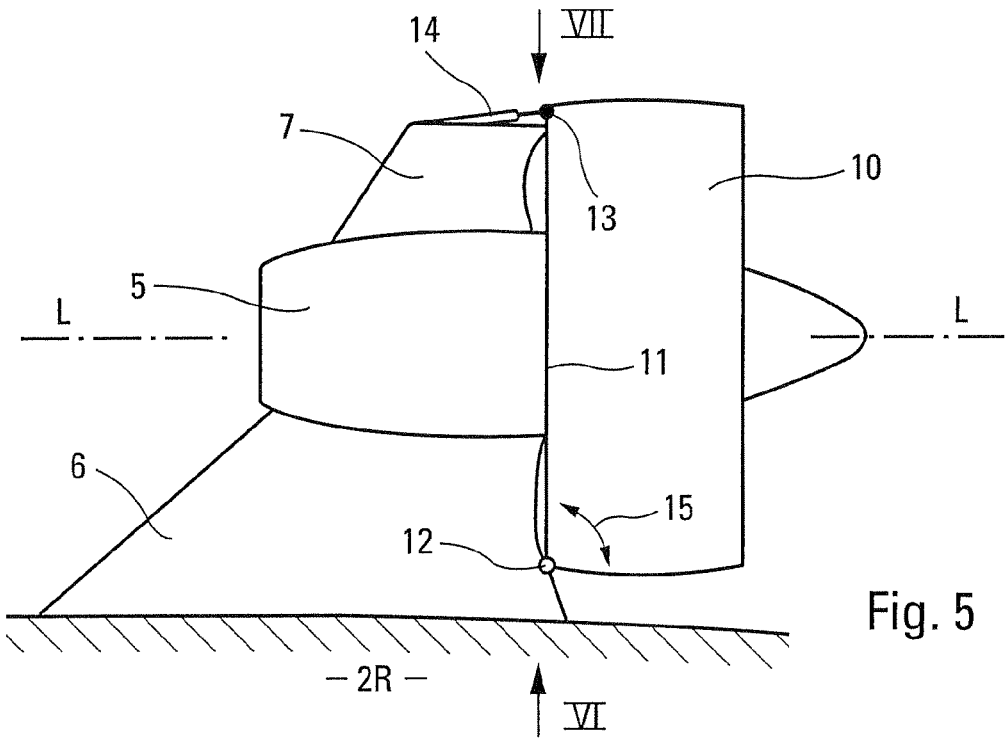
FIG. 5 shows, on an enlarged scale, the assembly of the cowling jointed to the pylon.
Figures 6, 7:
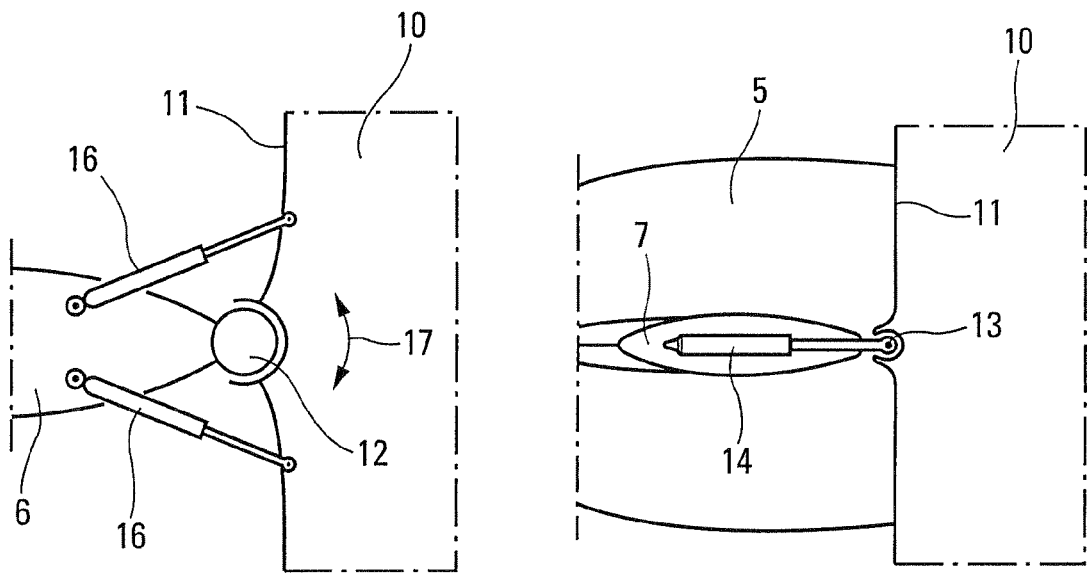
FIGS. 6 and 7 are schematic views, as seen in the direction of the arrows VI and VII shown in FIG. 5, respectively, of the lower joint and of the upper joint of the propeller cowling.

As is illustrated in FIGS. 5 to 7, the cowling 10 is jointed to the pylon 6. In the example represented in these figures, the lower portion of the leading edge 11 of the cowling 10 is jointed to the pylon 6 by means of a ball joint 12. Furthermore, the upper portion of said leading edge 11 is jointed at 13 to an actuating device 14 supported on the extension 7 to enable the cowling 10 to be tilted from fore to aft around the ball 12, as is illustrated by the double arrow 15 in FIG. 5.

Moreover, by virtue of other actuating devices 16, the cowling 10 can be tilted sideways around the ball 12, as is illustrated by the double arrow 17 in FIG. 6.

Therefore, the cowling 10 can be tilted with respect to the axis L-L of the engine 5. As a result, when the propellers 8, 9 are turning and expel a stream of air, or efflux, at the rear of said cowling, the orientation of said efflux about said axis L-L can be modified such that said efflux of variable orientation can be used to control the direction and pitch of said aircraft 1, and thus replace a horizontal stabilizer and a vertical stabilizer.

The example of a commercial aircraft 21, according to the present invention and represented schematically by FIGS. 8 to 10, likewise has a longitudinal axis X-X and a vertical mid-plane V-V and comprises a fuselage 22 and wings 23. No turbine engine is carried by the wings 23 and, exactly like the aircraft 1 described above, the aircraft 21 comprises neither a horizontal stabilizer nor a vertical stabilizer.

Mounted symmetrically on the back of the rear portion 22R of the fuselage 22 are two propeller engines 25G and 25D arranged one beside the other with their axes L-L parallel to the longitudinal axis X-X of the aircraft 21. The engines 25G and 25D are respectively carried by pylons 26G, 26D, each of which is extended above the respective engine 25G, 25D by an extension 27G, 27D. On its rear side, each engine 25G, 25D comprises two contrarotating pusher propellers 28, 29. The propellers 28, 29 of the engine 25G are surrounded by a cowling 30G and the propellers of the engine 25D are surrounded by a cowling 30D.

It will be readily understood from what has been described above that the cowlings 30G and 30D shield the noise from the propellers of the engines 25G and 25D.

Of course, each cowling 30G, 30D can be jointed to the pylon 26G, 26D and to the corresponding extension 27G, 27D by a ball joint similar to that described above and illustrated in FIGS. 5 to 7. However, in the example represented in FIGS. 8 to 10, the pylons 26G, 26D form a V which is open to the top and which is symmetrical with respect to the vertical mid-plane V-V, and, in this case, the joints of said cowlings can be simplified.

As is thus illustrated in FIGS. 11 and 12, the front portion of each cowling 30G, 30D is jointed to the associated pylon 26G, 26D about an axis Z-Z whose direction is coincident with the general direction of the corresponding pylon. As a result, the two joint axes Z-Z form a V which is symmetrical with respect to the vertical mid-plane V-V and which is open to the top. Actuating means 32 are provided to turn the cowlings 30G, 30D about the corresponding axis Z-Z, as is illustrated by the double arrow 33.

Each of the two joint axes Z-Z is defined by a lower joint 34 between the front lower portion of the cowling 30G, 30D and the corresponding pylon 26G, 26D and by an upper joint 35 between the front upper portion of the cowling 30G, 30D and the corresponding pylon extension 27G, 27D.

When, as is illustrated in FIG. 13, the two cowlings 30G and 30D turn in the same direction, the aircraft 21 is controlled directionally owing to the fact that the effluxes from the engines 25G and 25D are inclined with respect to the vertical mid-plane V-V.

Owing to the V-shaped arrangement of the axes Z-Z, when the two cowlings 30G and 30D turn in such a way that their effluxes converge (FIG. 14), the aircraft 21 is made to nose up, whereas if said cowlings 30G and 30D are turned in such a way that their effluxes diverge (FIG. 15), the aircraft 21 is made to nose down.

The invention claimed is:

1. An aircraft with reduced environmental impact, having a fuselage with a longitudinal axis and a vertical mid-plane containing said longitudinal axis, said aircraft comprising:

at least one engine provided with at least one pusher propeller, said engine having its axis at least substantially parallel to said longitudinal axis of the fuselage and being mounted at the aft of the aircraft and on the top of the fuselage by way of a pylon which supports said engine and separates said engine from said fuselage, said pylon comprising an extension above said engine; and a movable cowling which is arranged around said propeller and jointed in one piece to said pylon, such that the efflux from said propeller can be oriented with respect to said axis of said engine so as to be able to control the direction and the pitch of said aircraft, without the need of a horizontal stabilizer and a vertical stabilizer for the aircraft a lower portion of said cowling being jointed to said pylon, whereas an upper portion of said cowling is jointed with respect to said extension; and at least one actuating unit supported by said pylon or said extension to turn said cowling with respect to said pylon.

2. The aircraft as claimed in claim 1, wherein said engine comprises two contrarotating coaxial propellers, both arranged inside said cowling.

3. The aircraft as claimed in claim 1, wherein said lower portion of the cowling is ball-jointed to said pylon and an actuating unit is provided, both at the lower portion and at the upper portion of said cowling, to turn said cowling around said ball.

4. The aircraft as claimed in claim 1, wherein the at least one engine comprises a single one of the engines which has a ducted propeller or ducted propellers and is mounted at the aft of the aircraft and on the top of the fuselage of said aircraft, and the aircraft further comprises at least two turbine engines carried symmetrically by wings of said aircraft.

5. The aircraft as claimed in claim 1, wherein the at least one engine comprises two of the engines which each respectively have a ducted propeller or ducted propellers and are mounted at the aft of the aircraft and on the top of the fuselage of said aircraft and which are arranged one beside the other with their axes parallel.

6. The aircraft as claimed in claim 1, wherein the at least one engine comprises two of the engines which each respectively have a ducted propeller or ducted propellers and are mounted at the aft of the aircraft and on the top of the fuselage of said aircraft and which are arranged one beside the other with their axes parallel, wherein the two pylons respectively carrying said engines form a V which is symmetrical with respect to said vertical mid-plane and which is open to the top, the cowling of each of said engines being jointed about an axis whose direction is coincident with the general direction of the corresponding pylon, and the two joint axes forming a V which is symmetrical with respect to said vertical mid-plane and which is open to the top, and wherein an actuating unit is designed to turn each of said cowlings about the corresponding joint axis.

7. The aircraft as claimed in claim 1, wherein each of said two joint axes is defined by a lower joint between the front lower portion of said cowling and the pylon and by an upper joint between the front upper portion of said cowling and said extension of the pylon.

* * * * *